(12) United States Patent
Uchino et al.

(10) Patent No.: US 12,052,612 B2
(45) Date of Patent: Jul. 30, 2024

(54) MASTER NODE AND SECONDARY NODE

(71) Applicant: NTT DOCOMO, INC., Tokyo (JP)

(72) Inventors: Tooru Uchino, Tokyo (JP); Tianyang Min, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 17/634,885

(22) PCT Filed: Aug. 14, 2019

(86) PCT No.: PCT/JP2019/031980
§ 371 (c)(1),
(2) Date: Feb. 11, 2022

(87) PCT Pub. No.: WO2021/029048
PCT Pub. Date: Feb. 18, 2021

(65) Prior Publication Data
US 2022/0408322 A1 Dec. 22, 2022

(51) Int. Cl.
*H04W 36/00* (2009.01)
(52) U.S. Cl.
CPC .............. *H04W 36/0055* (2013.01)
(58) Field of Classification Search
CPC ....... H04W 36/0055; H04W 36/00692; H04W 76/19; H04W 76/10
See application file for complete search history.

(56) References Cited

U.S. PATENT DOCUMENTS

| | | | |
|---|---|---|---|
| 11,665,761 B2* | 5/2023 | Shih | H04B 17/382 370/328 |
| 11,765,574 B2* | 9/2023 | Dhanapal | H04W 72/0453 370/329 |
| 11,917,463 B2* | 2/2024 | Chen | H04W 36/0069 |
| 11,924,704 B2* | 3/2024 | Da Silva | H04W 36/00838 |
| 2019/0037625 A1 | 1/2019 | Shih et al. | |
| 2022/0167233 A1* | 5/2022 | Shi | H04W 76/30 |

FOREIGN PATENT DOCUMENTS

EP 4013125 A1 * 6/2022 ............ H04W 36/36
WO WO-2019192467 A1 * 10/2019

OTHER PUBLICATIONS

International Search Report issued in PCT/JP2019/031980 on Feb. 10, 2020 (2 pages).
Written Opinion of the International Searching Authority issued in PCT/JP2019/031980 on Feb. 10, 2020 (4 pages).
(Continued)

*Primary Examiner* — Ahmed Elallam
(74) *Attorney, Agent, or Firm* — Osha Bergman Watanabe & Burton LLP

(57) ABSTRACT

An SN (100C) includes a transmitting unit (110b) that transmits, to an MN (100A) to which a terminal (200) is connected, a first message including configuration information of a cell formed by the SN (100C), and a control unit (140b) that determines to delete the configuration information of the cell according to a state of the cell. The transmitting unit (110b) transmits, to the MN (100A), a second message instructing deletion of the configuration information of the cell.

4 Claims, 12 Drawing Sheets

(56) References Cited

OTHER PUBLICATIONS

Ericsson (Rapporteur); "Summary on email discussion [103#48] on RRC details for NR-DC"; 3GPP TSG-RAN WG2 #103bis, Tdoc R2-1814575; Chengdu, China; Oct. 8-12, 2018 (11 pages).
CATT; "Considerations on bearer type change"; 3GPP TSG-RAN WG3 Meeting #98, R3-174547; Reno, Nevada, USA; Nov. 27-Dec. 1, 2017 (8 pages).
ZTE; "Further Discussion on Mode Change between Single and Two NG-U tunnels"; 3GPP TSG RAN WG3#1801ad-hoc, R3-180026; Sophia-Antipolice, France; Jan. 22-26, 2018 (6 pages).
Intel Corporation; "New WID: NR mobility enhancements"; 3GPP TSG RAN Meeting #83, RP-190489; Shenzhen, China; Mar. 18-21, 2019 (5 pages).
3GPP TS 37.340 V15.6.0; "3rd Generation Partnership Project; Technical Specification Group Radio Access Network; Evolved Universal Terrestrial Radio Access (E-UTRA) and NR; Multi-connectivity: Stage 2 (Release 15)"; Jun. 2019 (69 pages).

\* cited by examiner

MASTER NODE AND SECONDARY NODE

TECHNICAL FIELD

The present invention relates to a master node and a secondary node that perform a procedure for changing a secondary node.

BACKGROUND ART

The 3rd Generation Partnership Project (3GPP) specifies Long Term Evolution (LTE) and specifies LTE-Advanced (hereinafter, collectively referred to as LTE) for the purpose of further speeding up the LTE. In addition, in the 3GPP, specification of a succession system of the LTE, called 5G or New Radio (NR), has been studied.

In the 3GPP, dual connectivity (DC) in which a terminal is simultaneously connected to a master node (MN) and a secondary node (SN) is defined (see Non Patent Document 1).

A group of cells subordinate to the MN is called a master cell group (MCG), and a group of cells subordinate to the SN is called a secondary cell group (SCG).

Also, a procedure of changing an SN, which is called a Conditional SCG change, is studied in the 3GPP (Non Patent Document 2).

In the Conditional SCG change, an MN previously notifies a terminal, which is connected to a source SN, of plural pieces of configuration information of candidate cells that include a candidate cell in a transition destination, which are subordinate to different SNs, and transition conditions to the candidate cells.

Specifically, each of the different SNs transmits configuration information of a candidate cell to the MN in response to a request from the MN. The MN notifies the terminal of the received configuration information of the candidate cell.

When a transition condition to a candidate cell is satisfied, the terminal executes a random access procedure with an SN, in which the transition condition to the candidate cell is configured, without waiting for an instruction from the MN, and transitions from the source SN to the SN.

PRIOR ART DOCUMENT

Non-Patent Document

Non Patent Document 1: 3GPP TS37.340 V15.6.0, 3rd Generation Partnership Project; Technical Specification Group Radio Access Network; Evolved Universal Terrestrial Radio Access (E-UTRA) and NR; Multi-connectivity; Stage 2 (Release 15)

Non Patent Document 2: "New WID: NR mobility enhancements," RP-190489, 3GPP TSG RAN Meeting #83, 3GPP, March 2019

SUMMARY OF THE INVENTION

However, a load on an MN may be increased in a Conditional SCG change.

More specifically, in a case where the MN determines whether a candidate cell notified from each SN is suitable as a candidate cell in a transition destination based on a load state of the candidate cell, there is a possibility that the load on the MN is increased.

Also, in a case where the MN includes configuration information of each candidate cell into an individual message and performs transmission thereof to a terminal, there is a possibility that the load on the MN is increased.

Further, in a case where the MN assigns an identifier to be used to identify configuration information of each candidate cell to the configuration information of the candidate cell, there is a possibility that the load on the MN is increased.

Thus, the present invention is provided in view of such a situation, and is to provide a master node and a secondary node that can avoid an increase in a load on the master node even in a case where a terminal changes a secondary node based on configuration information of a candidate cell.

According to an aspect of the present invention, a secondary node (100C) includes a transmitting unit (110b) that transmits, to a master node (100A) to which a terminal (200) is connected, a first message including configuration information of a cell formed by the secondary node (100C), and a control unit (140b) that determines to delete the configuration information of the cell according to a state of the cell, wherein the transmitting unit (110b) transmits, to the master node (100A), a second message instructing deletion of the configuration information of the cell.

According to an aspect of the present invention, a master node (100A) includes a receiving unit (120a) that receives, from respective secondary nodes (100C and 100D), plural pieces of configuration information of cells formed by the respective secondary nodes (100C and 100D), a control unit (140a) that includes a list including the plural pieces of configuration information of the cells into a specific message, and a transmitting unit (110a) that transmits the specific message to a terminal (200).

According to an aspect of the present invention, a secondary node (100C or 100D) includes a control unit (140b) that assigns an identifier to configuration information of a cell formed by the secondary node (100C or 100D), and a transmitting unit (110b) that transmits, to a master node (100A) to which a terminal (200) is connected, the configuration information of the cell to which information the identifier is assigned.

MODES FOR CARRYING OUT THE INVENTION

Figure 1:
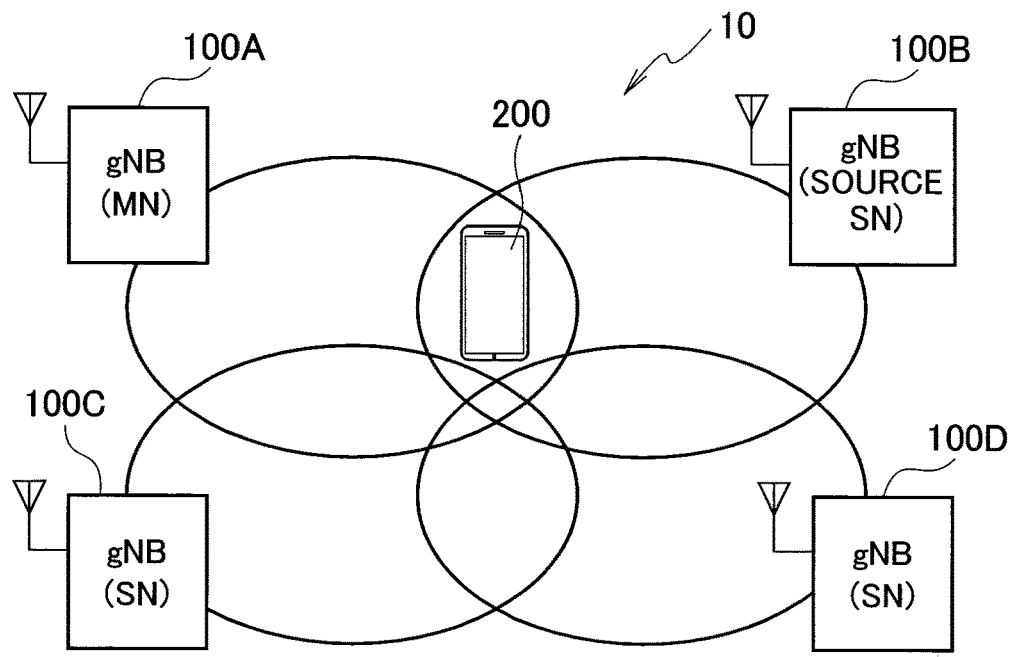
FIG. 1 is an overall schematic configuration diagram of a radio communication system 10.

Hereinafter, embodiments will be described with reference to the drawings. Note that the same functions or configurations are denoted by the same or similar reference numerals, and a description thereof is omitted as appropriate.

(1) Overall Schematic Configuration of Radio Communication System

FIG. 1 is an overall schematic configuration diagram of a radio communication system 10 according to the present embodiment. The radio communication system 10 is a radio communication system according to New Radio (NR), and includes a Next Generation-Radio Access Network (NG-RAN, not illustrated) and a terminal 200.

The NG-RAN includes radio base stations 100A, 100B, 100C, and 100D (hereinafter, referred to as gNBs 100A, 100B, 100C, and 100D). Note that a specific configuration of the radio communication system 10 including the number of gNBs and terminals is not limited to the example illustrated in FIG. 1.

The NG-RAN actually includes a plurality of NG-RAN Nodes, specifically, gNBs (or ng-eNBs), and is connected to a core network (5GC, not illustrated) according to the NR. Note that the NG-RAN and the 5GC may be simply expressed as a network.

Each of the gNBs 100A, 100B, 100C, and 100D is a radio base station according to the NR, and performs radio communication with the terminal 200 according to the NR. The gNBs 100A, 100B, 100C, and 100D and the terminal 200 can support Massive MIMO in which a more highly directional beam is generated, carrier aggregation (CA) in which a plurality of component carriers (CCs) are bundled to be used, dual connectivity (DC) for simultaneously performing communication between a plurality of NG-RAN Nodes and a terminal, and the like, by controlling a radio signal transmitted from a plurality of antenna elements. Note that the CC is also called a carrier.

Each of the gNBs 100A, 100B, 100C, and 100D forms one or more cells and manages the cells. In the NR, the cells are classified as follows.

A group of cells associated with a gNB (also called master node (MN)) that provides a control plane connected to a core network, is called a master cell group (MCG). The MCG includes a primary cell (hereinafter, PCell) and one or more secondary cells (hereinafter, SCell). The PCell is a cell to be used by a terminal to start initial connection with the MN. Note that the MCG may only include the PCell.

A group of cells associated with a gNB (also called secondary node (SN)) that provides an additional resource to a terminal without providing a control plane connected to a core network, is called a secondary cell group (SCG). The SCG includes a primary SCell (hereinafter, PSCell) and one or more SCells. The PSCell is a cell to be used by a terminal to start initial connection with the SN. Note that the SCG may only include the PSCell.

Note that the PCell is also called a special cell (SpCell) in the MCG. Also, the PSCell is also called an SpCell in the SCG.

In the present embodiment, the MN includes the gNB 100A, and the SN includes the gNBs 100B, 100C, and 100D. In this case, the terminal 200 is connected to the gNB 100A (MN) and one of the gNBs 100B, 100C, and 100D (SN), and executes the DC.

In the DC, the terminal 200 can transition between cells formed by the gNBs 100B, 100C, and 100D (SN) in a state of being connected to the gNB 100A (MN). Note that "transition between cells formed by the gNBs 100B, 100C, and 100D (SN)" can be expressed as "transition between PSCells formed by the gNBs 100B, 100C, and 100D (SN)," "transition between the gNBs 100B, 100C, and 100D (SN)," or "transition between the radio base stations 100B, 100C, and 100D." In addition, "cells subordinate to the gNBs 100B, 100C, and 100D (SN)" mean "cells formed by the gNBs 100B, 100C, and 100D (SN)."

The "transition" typically means a handover between cells, or a handover between gNBs, and can include a behavior of the terminal 200 which causes a change of a connection destination cell (PSCell) or a connection destination gNB (SN), such as SN change.

A cell in a transition destination to which the terminal 200 transitions, is called a target cell. Also, an SN in a transition destination to which the terminal 200 transitions, is called a target SN. In the present embodiment, the gNB 100C or the gNB 100D is the target SN.

Meanwhile, a cell in a transition source is called a source cell. An SN in a transition source is called a source SN. In the present embodiment, the gNB 100B is the source SN.

In the radio communication system 10, the terminal 200 performs an SN change called a conditional SCG change (Conditional SCG change) in the DC. Note that the Conditional SCG change may be abbreviated as CSC.

In the Conditional SCG change, the MN (gNB 100A) notifies the terminal 200 connected to the source SN (gNB 100B), in advance, of one or more pieces of configuration information of one or more candidate cells each of which includes a candidate cell (PSCell) in a transition destination subordinate to a different SN (gNB 100C or 100D), and a transition condition to the candidate cell. When a transition condition to a candidate cell is satisfied, the terminal 200 performs a random access (RA) procedure with an SN in which the transition condition to the candidate cell is configured, without waiting for an instruction from the MN, and transitions from the source SN to the SN (target SN).

Note that the radio communication system 10 may include an Evolved Universal Terrestrial Radio Access Network (E-UTRAN) instead of the NG-RAN. In this case, the E-UTRAN includes a plurality of E-UTRAN nodes, specifically, eNBs (or en-gNBs), and is connected to a core network (evolved packet core (EPC)) according to LTE.

(2) Functional Block Configuration of Radio Communication System

Next, a functional block configuration of the radio communication system 10 will be described. Specifically, a functional block configuration of each of the gNBs 100A, 100B, 100C, and 100D will be described. Hereinafter, only portions related to the features in the present embodiment will be described. Therefore, each of the gNBs 100A, 100B, 100C, and 100D has other functional blocks that are not directly related to the features in the present embodiment.

Figure 2:
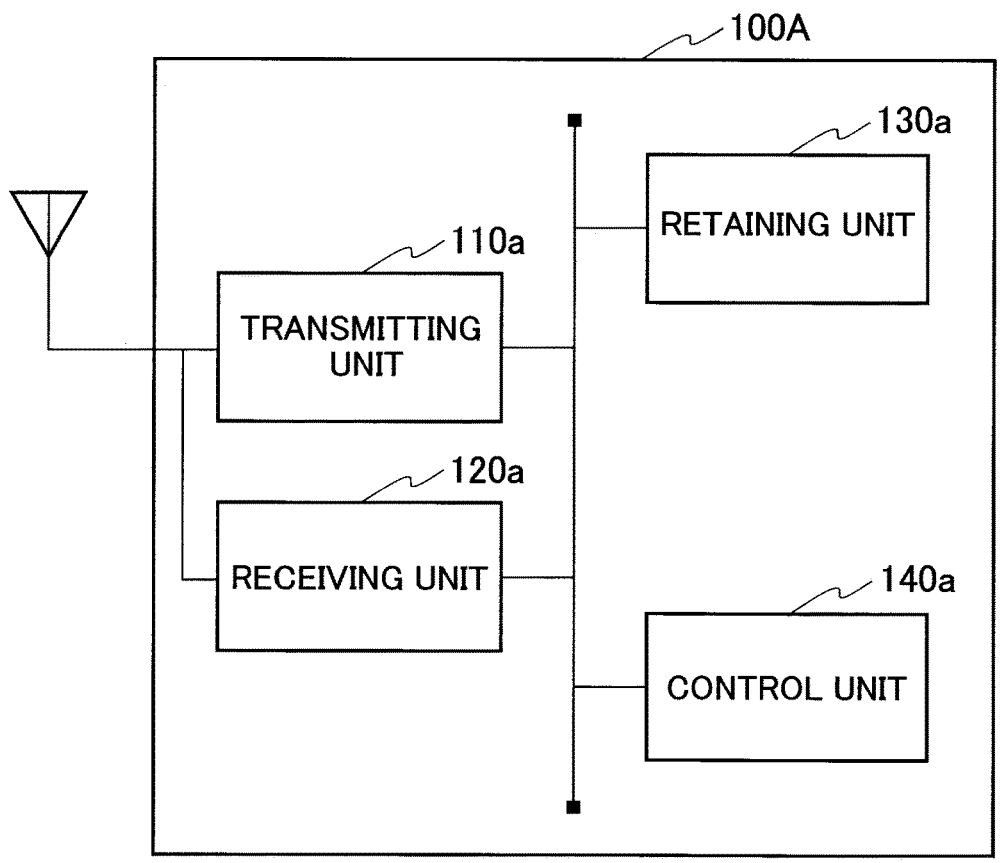
FIG. 2 is a functional block configuration diagram of a gNB 100A.

FIG. 2 is a functional block configuration diagram of the gNB 100A. As illustrated in FIG. 2, the gNB 100A includes a transmitting unit 110a, a receiving unit 120a, a retaining unit 130a, and a control unit 140a.

The transmitting unit 110a transmits a downlink signal (DL signal) according to the NR. The receiving unit 120a receives an uplink signal (UL signal) according to the NR. Specifically, the transmitting unit 110a and the receiving unit 120a perform wireless communication with the terminal 200 on a control channel or a data channel.

The transmitting unit 110a transmits a radio resource control (RRC) reconfiguration message (RRC Reconfiguration) to the terminal 200.

The receiving unit 120a receives an RRC reconfiguration completion message (Reconfiguration Complete) from the terminal 200.

The transmitting unit 110a transmits a signal according to the NR to the gNBs 100B, 100C, and 100D included in the SNs. The receiving unit 120a receives a signal according to the NR from the gNBs 100B, 100C, and 100D included in the SNs.

In a case where the terminal 200 is connected to the gNB 100A (MN) and the gNB 100B (source SN) and executes the DC, the transmitting unit 110a transmits an SN release request message (SN Release Request) to the gNB 100B (source SN) in an MN-initiated SN change. The receiving unit 120a receives an SN release request response message (SN Release Request Ack) from the gNB 100B (source SN).

In a case where the terminal 200 is connected to the gNB 100A (MN) and the gNB 100B (source SN) and executes the DC, the receiving unit 120a receives an SN change request message (SN Change Required) from the gNB 100B (source SN) in an SN-initiated SN change. The transmitting unit 110a transmits an SN change confirmation message (SN Change Confirm) to the gNB 100B (source SN).

In a case where the terminal 200 is connected to the gNB 100A (MN) and the gNB 100B (source SN) and executes the DC, the transmitting unit 110a transmits an SN addition request message (SN Addition Request) to at least one of the gNBs 100C and 100D (SN) in execution of the SN change. The receiving unit 120a receives an SN addition request response message (SN Addition Request Ack) from at least one of the gNBs 100C and 100D (SN).

In a case where the terminal 200 is connected to the gNB 100A (MN) and the gNB 100B (source SN) and executes the DC, the transmitting unit 110a transmits an SN reconfiguration completion message (SN Reconfiguration Complete) to at least one of the gNBs 100C and 100D (SN) in execution of the SN change. The receiving unit 120a receives an SN addition cancellation message (SN Addition Cancellation) from at least one of the gNBs 100C and 100D (SN).

Note that the SN Addition Request Ack includes configuration information of a candidate cell, and the SN Addition Cancellation instructs to delete the configuration information of the candidate cell, as described later. Also, as described later, the RRC Reconfiguration includes a list including plural pieces of configuration information of candidate cells.

The retaining unit 130a retains configuration information of a candidate cell received from at least one of the gNBs 100C and 100D (SN).

The control unit 140 controls each functional block included in the gNB 100A.

The control unit 140a includes the configuration information of the candidate cell into RRC Reconfiguration. Specifically, the control unit 140a includes, into RRC Reconfiguration, a list including plural pieces of configuration information of candidate cells.

The control unit 140a assigns a transaction identifier (ID) to RRC Reconfiguration. When the terminal 200 receives RRC Reconfiguration, the receiving unit 120a receives RRC Reconfiguration Complete including the transaction ID from the terminal 200.

Figure 3:
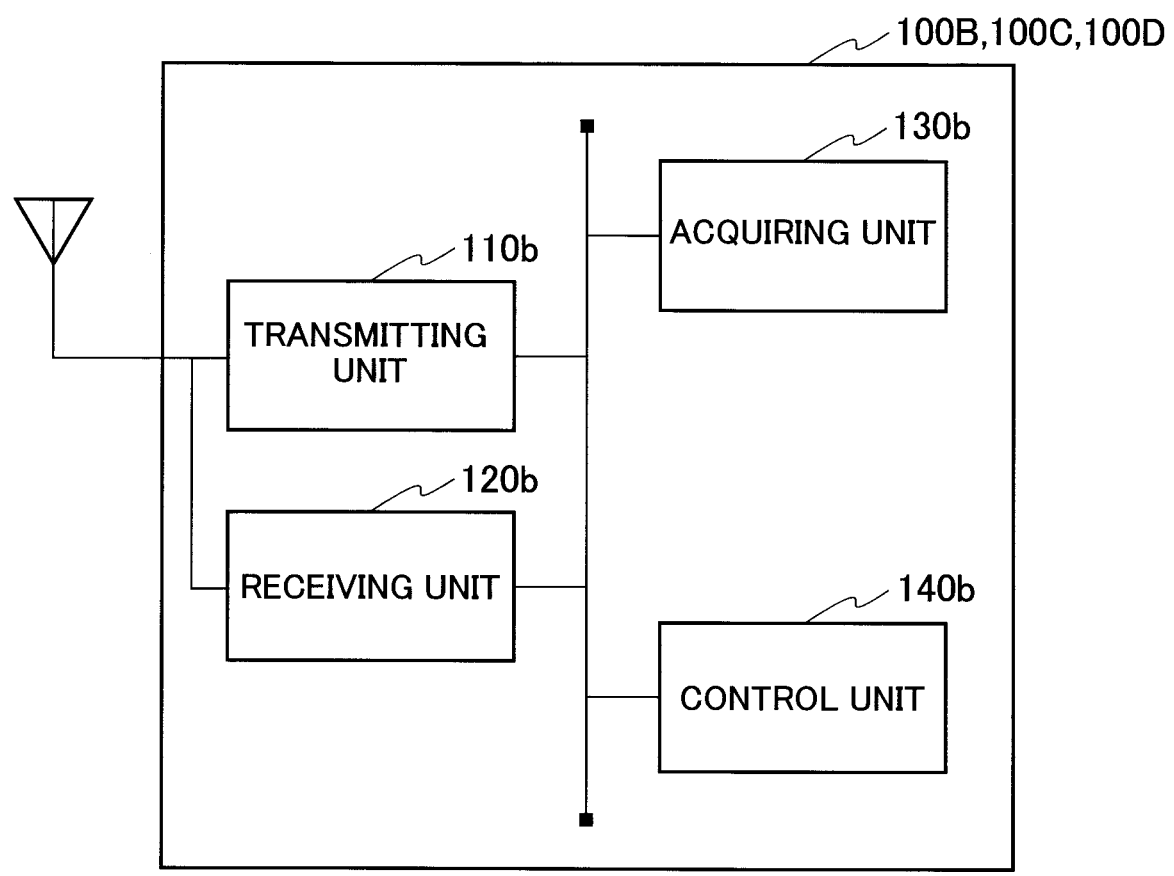
FIG. 3 is a functional block configuration diagram of each of gNBs 100B, 100C and 100D.

FIG. 3 is a functional block configuration diagram of each of the gNBs 100B, 100C, and 100D. Since the gNBs 100B and 100D have the same configuration as the gNB 100C, an explanation of the gNBs 100B and 100D will be omitted. As illustrated in FIG. 3, the gNB 100C is included in an SN, and includes a transmitting unit 110b, a receiving unit 120b, an acquiring unit 130b, and a control unit 140b.

The transmitting unit 110b transmits a signal according to the NR to the gNB 100A included in the MN. The receiving unit 120b receives a signal according to the NR from the gNB 100A included in the MN.

In a case where the terminal 200 is connected to the gNB 100A (MN) and the gNB 100B (source SN) and executes the DC, the receiving unit 120b receives SN Addition Request from the gNB 100A (MN) in execution of an SN change. The transmitting unit 110b transmits SN Addition Request Ack to the gNB 100A (MN).

In a case where the terminal 200 is connected to the gNB 100A (MN) and the gNB 100B (source SN) and executes the DC, the receiving unit 120b receives SN Reconfiguration Complete from the gNB 100A (MN) in execution of the SN change. The transmitting unit 110b transmits SN Addition Cancellation to the gNB 100A (MN).

The acquiring unit 130b acquires configuration information of a candidate cell formed by the gNB 100C (SN).

The control unit 140b controls each functional block included in the gNB 100C (SN).

The control unit 140b includes the configuration information of the candidate cell, which is acquired by the acquiring unit 130b, into SN Addition Request Ack and performs transmission thereof to the gNB 100A (MN).

The control unit 140b determines deletion of the configuration information of the candidate cell according to a state of the candidate cell. When the control unit 140b determines to delete the configuration information of the candidate cell, the transmitting unit 110b transmits SN Addition Cancellation to the gNB 100A (MN).

The control unit 140b determines whether the terminal 200 transitions to the gNB 100C within a specified period based on the configuration information of the candidate cell. The transmitting unit 110b transmits SN Addition Cancellation to the gNB 100A (MN) in a case where the terminal 200 does not transition to the gNB 100C (SN) within the specified period based on the configuration information of the candidate cell.

The control unit 140b assigns a transaction ID to the configuration information of the candidate cell. The transmitting unit 110b transmits the configuration information of the candidate cell, to which the transaction ID is assigned, to the gNB 100A (MN) by using SN Addition Request Ack. When the terminal 200 is connected to the gNB 100B (SN), the receiving unit 120b receives the RRC Reconfiguration Complete including the transaction ID from the terminal 200.

(3) Operation of Radio Communication System

Next, an operation of the radio communication system 10 will be described. More specifically, the following operations will be described in order.

Cancellation of SN addition in Conditional SCG change

Configuration of RRC Reconfiguration in Conditional SCG change

Assignment of transaction identifier (ID) in Conditional SCG change (3.1) Cancellation of SN Addition in Conditional SCG Change First, cancellation of SN addition in the Conditional SCG change will be described. In the present embodiment, after transmitting configuration information of a candidate cell to the gNB 100A (MN), the gNB 100C (SN) instructs the gNB 100A (MN) to delete the configuration information of the candidate cell. Note that the terminal 200 is initially connected to the gNB 100A (MN) and the gNB 100B (source SN) and executes the DC.

(3.1.1) Operation Example 1

First, Operation Example 1 of cancelling SN addition in the Conditional SCG change will be described. In the present operation example, an MN-initiated SN change is executed.

Figure 4:
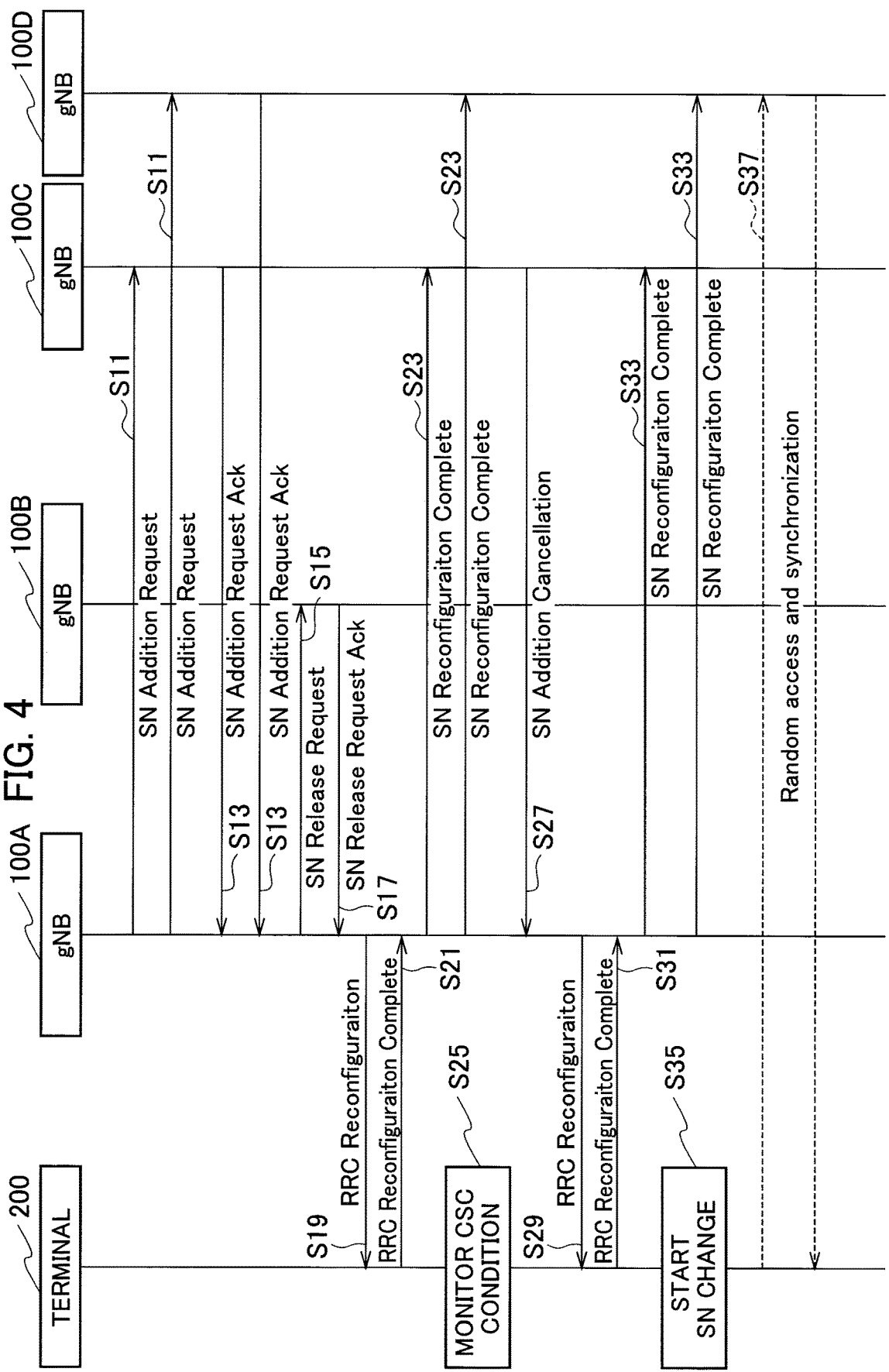
FIG. 4 is a diagram illustrating a sequence of cancelling SN addition (Operation Example 1) in a Conditional SCG change.

FIG. 4 is a diagram illustrating a sequence of cancelling SN addition (Operation Example 1) in the Conditional SCG change. As illustrated in FIG. 4, the gNB 100A (MN) transmits SN Addition Request to each of the gNBs 100C and 100D (SN) other than the gNB 100B (source SN) (S11).

When receiving the SN Addition Request from the gNB 100A (MN), the gNB 100C (SN) transmits SN Addition Request Ack including configuration information of a cell subordinate to the gNB 100C (referred to as a candidate cell) to the gNB 100A (MN) (S13). The configuration information of the candidate cell includes information of the candidate cell and a transition condition to the candidate cell.

Similarly, when receiving the SN Addition Request from the gNB 100A (MN), the gNB 100D (SN) transmits SN Addition Request Ack including configuration information of a cell subordinate to the gNB 100D (referred to as a candidate cell) to the gNB 100A (MN) (S13). The configuration information of the candidate cell includes information of the candidate cell and a transition condition to the candidate cell.

Note that the SN Addition Request Ack transmitted in S13 is also called a first message.

When receiving the SN Addition Request Ack from each of the gNBs 100C and 100D (SN), the gNB 100A (MN) transmits SN Release Request to the gNB 100B (source SN) (S15). When receiving SN Release Request, the gNB 100B (source SN) transmits SN Release Request Ack to the gNB 100A (MN), stops data transmission to the terminal 200, and releases an SN resource (S17).

When receiving SN Release Request Ack from the gNB 100B (source SN), the gNB 100A (MN) transmits RRC Reconfiguration to the terminal 200 (S19). RRC Reconfiguration includes plural pieces of the configuration information of the candidate cells which are received from the gNBs 100C and 100D (SN).

When receiving RRC Reconfiguration from the gNB 100A (MN), the terminal 200 transmits RRC Reconfiguration Complete to the gNB 100A (MN), and acquires the plural pieces of configuration information of the candidate cells from RRC Reconfiguration (S21).

When receiving RRC Reconfiguration Complete from the terminal 200, the gNB 100A (MN) transmits SN Reconfiguration Complete to each of the gNBs 100C and 100D (SN) (S23).

When transmitting RRC Reconfiguration Complete to the gNB 100A (MN), the terminal 200 monitors a Conditional SCG change condition (CSC condition) (S25). More specifically, the terminal 200 determines whether a transition condition to a candidate cell, which is included in the configuration information of each of the candidate cells, is satisfied.

The gNB 100C (SN) transmits SN Addition Cancellation to the gNB 100A (MN) when identifying that the candidate cell is in a state unsuitable for transition of the terminal 200 (S27).

More specifically, the gNB 100C (SN) may transmit the SN Addition Cancellation in S27 when determining that a load is increased in the candidate cell and the candidate cell is in a state unsuitable for transition of the terminal 200.

In this case, when a large number of terminals transition to the candidate cell and the number of connected terminals exceeds the maximum number of connected terminals which is permitted by the candidate cell, the gNB 100C (SN) may determine that the candidate cell is in a state unsuitable for the transition of the terminal 200.

For example, in call admission control (CAC), when the number of connected terminals in the candidate cell exceeds the maximum number of UE contexts, the gNB 100C (SN) determines that the candidate cell is in a state unsuitable for transition of the terminal 200.

Also, in a case where the terminal 200 does not transition to a candidate cell in a specified period based on the configuration information of the candidate cell (for example, a case where the terminal 200 is in an inactive state even when a specified period is exceeded), the gNB 100C (SN) may transmit SN Addition Cancellation in S27.

Furthermore, in a case where the gNB 100C (SN) receives UE context release from a gNB or ng-eNB other than the gNB 100A (MN), the gNB 100C (SN) may transmit SN Addition Cancellation in S27.

Note that the gNB 100C (SN) may directly transmit SN Addition Cancellation to the gNB 100A (MN) in S27. In this case, for example, Xn signaling is used for transmission of SN Addition Cancellation. Alternatively, the gNB 100C (SN) may transmit SN Addition Cancellation to the gNB 100A (MN) via a core network. In this case, for example, NG signaling is used for transmission of SN Addition Cancellation.

Note that the SN Addition Cancellation transmitted in S27 is also called a second message.

When receiving SN Addition Cancellation from the gNB 100C (SN), the gNB 100A (MN) notifies the terminal 200 of a change in the configuration information of the candidate cell by using RRC Reconfiguration after receiving RRC Reconfiguration Complete from the terminal 200 in S21 (S29).

More specifically, the gNB 100A (MN) includes, into RRC Reconfiguration, information instructing to delete the configuration information of the candidate cell subordinate to the gNB 100C (SN).

When receiving RRC Reconfiguration from the gNB 100A (MN), the terminal 200 transmits RRC Reconfiguration Complete to the gNB 100A (MN) (S31). Based on reception of RRC Reconfiguration, the terminal 200 deletes the configuration information of the candidate cell subordinate to the gNB 100C (SN).

When receiving RRC Reconfiguration Complete from the terminal 200, the gNB 100A (MN) transmits SN Reconfiguration Complete to each of the gNB 100C and the gNB 100D (S33).

When determining that a transition condition to a candidate cell is satisfied, for example, by a movement of the terminal 200, the terminal 200 determines to start an SN change to a gNB (SN), which manages the candidate cell, without receiving an instruction from the gNB 100A (MN) (S35). In the present embodiment, the terminal 200 determines to start an SN change to the gNB 100D (SN).

When determining to start an SN change to the gNB 100D (SN), the terminal 200 executes a random access (RA) procedure between the gNB 100D and the terminal 200, and establishes synchronization between the gNB 100D and the terminal 200 (S37). Thereby, the terminal 200 is connected to the gNB 100D (target SN).

Note that the gNB 100A (MN) may receive only information of a candidate cell from each of the gNBs 100C and 100D (SN) in S13. In this case, the gNB 100A (MN) transmits the information of the candidate cell and a condition with which the terminal 200 triggers the SN change, to the terminal 200 by using RRC Reconfiguration in S19.

In this case, the terminal 200 determines in S25 whether the condition for triggering the SN change is satisfied. When determining that the condition for triggering the SN change is satisfied, for example, by a movement of the terminal 200, the terminal 200 determines a candidate cell in a transition destination and starts an SN change to a gNB (SN) that manages the candidate cell in S35. The terminal 200 determines a candidate cell in a transition destination, for example, based on priority of each candidate cell which is assigned by the gNB 100A (MN), a state of a cell which is included in information of each candidate cell, or the like.

(3.1.2) Operation Example 2

Next, Operation Example 2 of cancelling SN addition in the Conditional SCG change will be described. In the present operation example, an MN-initiated SN change is executed.

Figure 5:
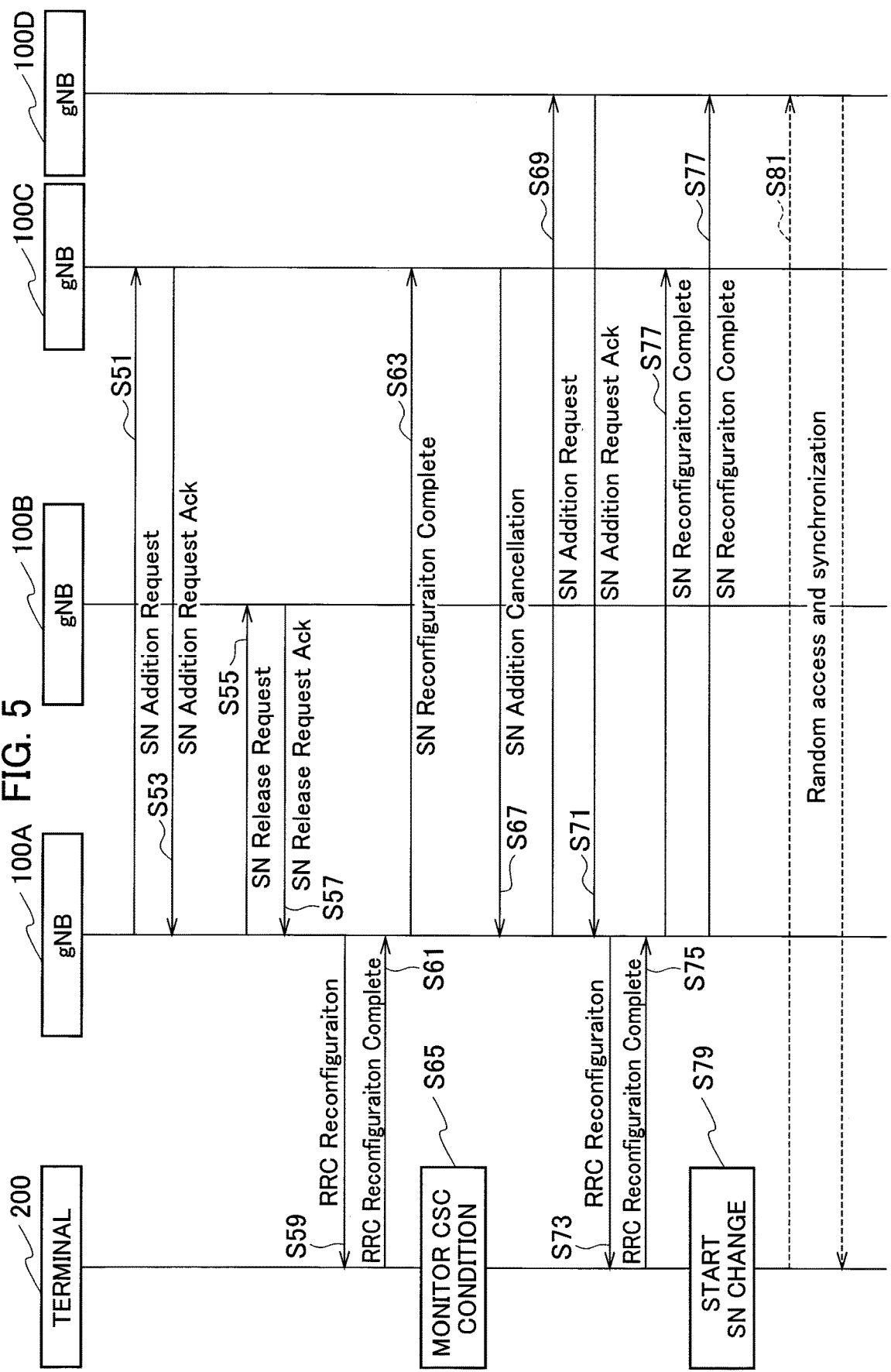
FIG. 5 is a diagram illustrating a sequence of cancelling SN addition (Operation Example 2) in the Conditional SCG change.

FIG. 5 is a diagram illustrating a sequence of cancelling SN addition (Operation Example 2) in the Conditional SCG change. Since S51 to S67 illustrated in FIG. 5 are the same processing as S11 to S27 illustrated in FIG. 4, an explanation thereof is omitted. Note that in the present operation example, the gNB 100A (MN) transmits SN Addition Request only to the gNB 100C (SN) (S51), and receives SN Addition Request Ack including configuration information of a candidate cell from the gNB 100C (S53).

When finding the gNB 100D (SN) that is present around the gNB 100A (MN) after receiving SN Addition Cancellation from gNB 100C (SN), the gNB 100A (MN) transmits SN Addition Request to the gNB 100D (S69).

When receiving SN Addition Request from the gNB 100A (MN), the gNB 100D (SN) transmits SN Addition Request Ack including configuration information of a candidate cell subordinate to the gNB 100D (SN) to the gNB 100A (MN) (S71).

When receiving SN Addition cancellation from the gNB 100C (SN) and receiving SN Addition Request Ack from the gNB 100D (SN), the gNB 100A (MN) notifies the terminal 200 of a change in the configuration information of the candidate cell by using RRC Reconfiguration after receiving RRC Reconfiguration Complete from the terminal 200 in S61 (S73).

More specifically, the gNB 100A (MN) includes only the configuration information of the candidate cell subordinate to the gNB 100D into RRC Reconfiguration.

When receiving the RRC Reconfiguration from the gNB 100A (MN), the terminal 200 transmits RRC Reconfiguration Complete to the gNB 100A (MN) (S75). Based on the reception of RRC Reconfiguration, the terminal 200 applies the configuration information of the candidate cell subordinate to the gNB 100D.

When receiving RRC Reconfiguration Complete from the terminal 200, the gNB 100A (MN) transmits SN Reconfiguration Complete to each of the gNBs 100C and 100D (S77).

When determining that a transition condition to the candidate cell is satisfied, for example, by a movement of the terminal 200, the terminal 200 determines to start an SN change to a gNB (SN), which manages the candidate cell, without receiving an instruction from the gNB 100A (MN) (S79). In the present embodiment, the terminal 200 determines to start an SN change to the gNB 100D (SN).

When determining to start the SN change to the gNB 100D, the terminal 200 executes a random access (RA) procedure between the gNB 100D and the terminal 200, and establishes synchronization between the gNB 100D and the terminal 200 (S81). Thereby, the terminal 200 is connected to the gNB 100D (target SN).

(3.1.3) Operation Example 3

Next, Operation Example 3 of cancelling SN addition in the Conditional SCG change will be described. In the present operation example, a source SN-initiated SN change is executed.

Figure 6:
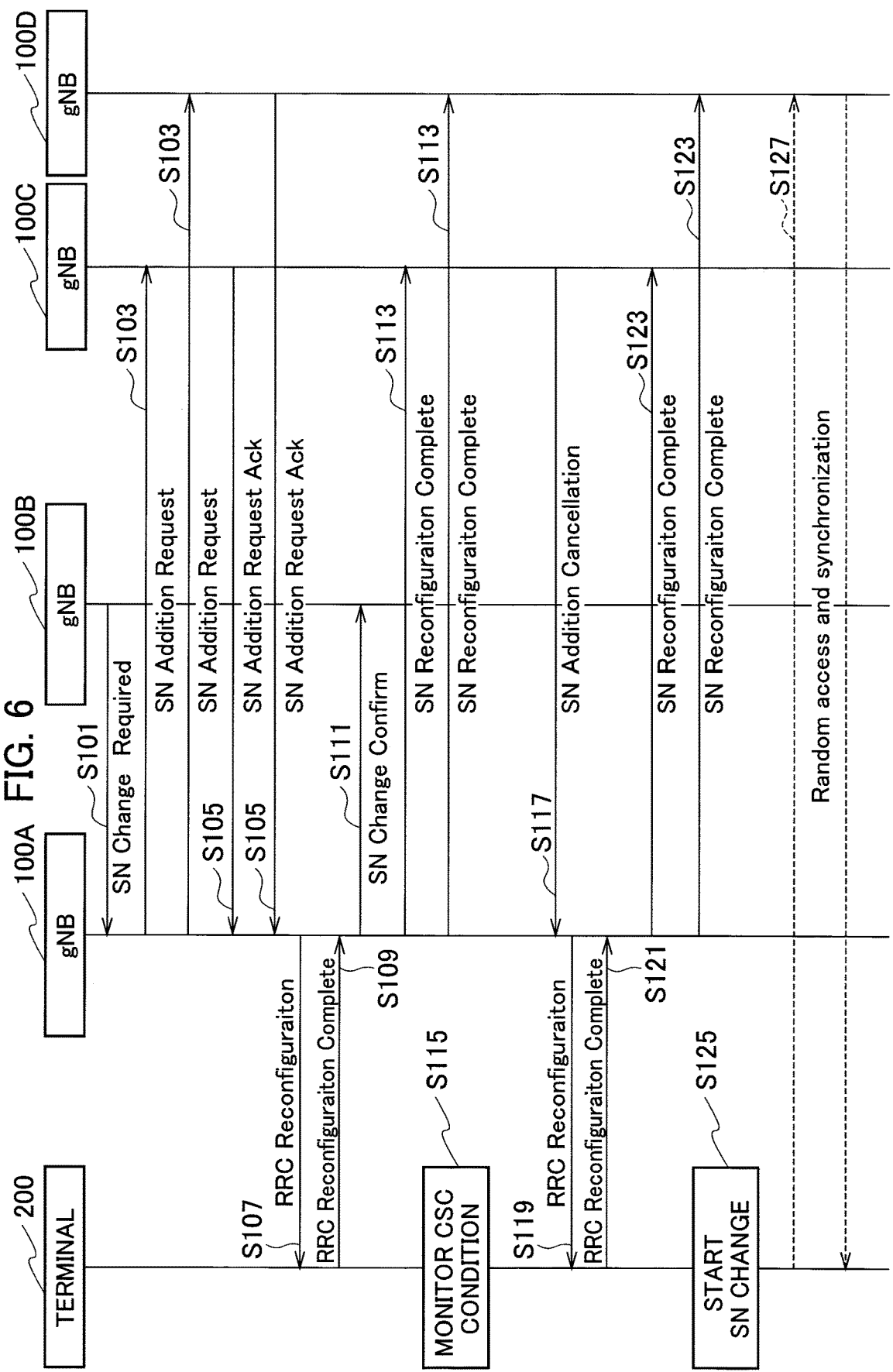
FIG. 6 is a diagram illustrating a sequence of cancelling SN addition (Operation Example 3) in the Conditional SCG change.

FIG. 6 is a diagram illustrating a sequence of cancelling SN addition (Operation Example 3) in the Conditional SCG change. Since S103 to S109 and S113 to 127 illustrated in FIG. 6 are the same processing as S11, S13, and S19 to S27 illustrated in FIG. 4, an explanation thereof is omitted.

The gNB 100B (source SN) transmits SN Change Required to the gNB 100A (MN) (S101). When receiving SN Change Required from gNB 100B (source SN), the gNB 100A (MN) transmits SN Addition Request to each of the gNBs 100C and 100D (SN) (S103).

When receiving RRC Reconfiguration Complete from the terminal 200 (S109), the gNB 100A (MN) transmits SN Change Confirm to the gNB 100B (source SN) (S111). When SN Change Confirm is transmitted to the gNB 100B (source SN), the gNB 100B (source SN) transmits SN Reconfiguration Complete to each of the gNBs 100C and 100D (S113).

When receiving SN Change Confirm from the gNB 100A (MN), the gNB 100B (source SN) stops data transmission to the terminal 200 and releases an SN resource.

(3.1.4) Operation Example 4

Next, Operation Example 4 of cancelling SN addition in the Conditional SCG change will be described. In the present operation example, a source SN-initiated SN change is executed.

Figure 7:
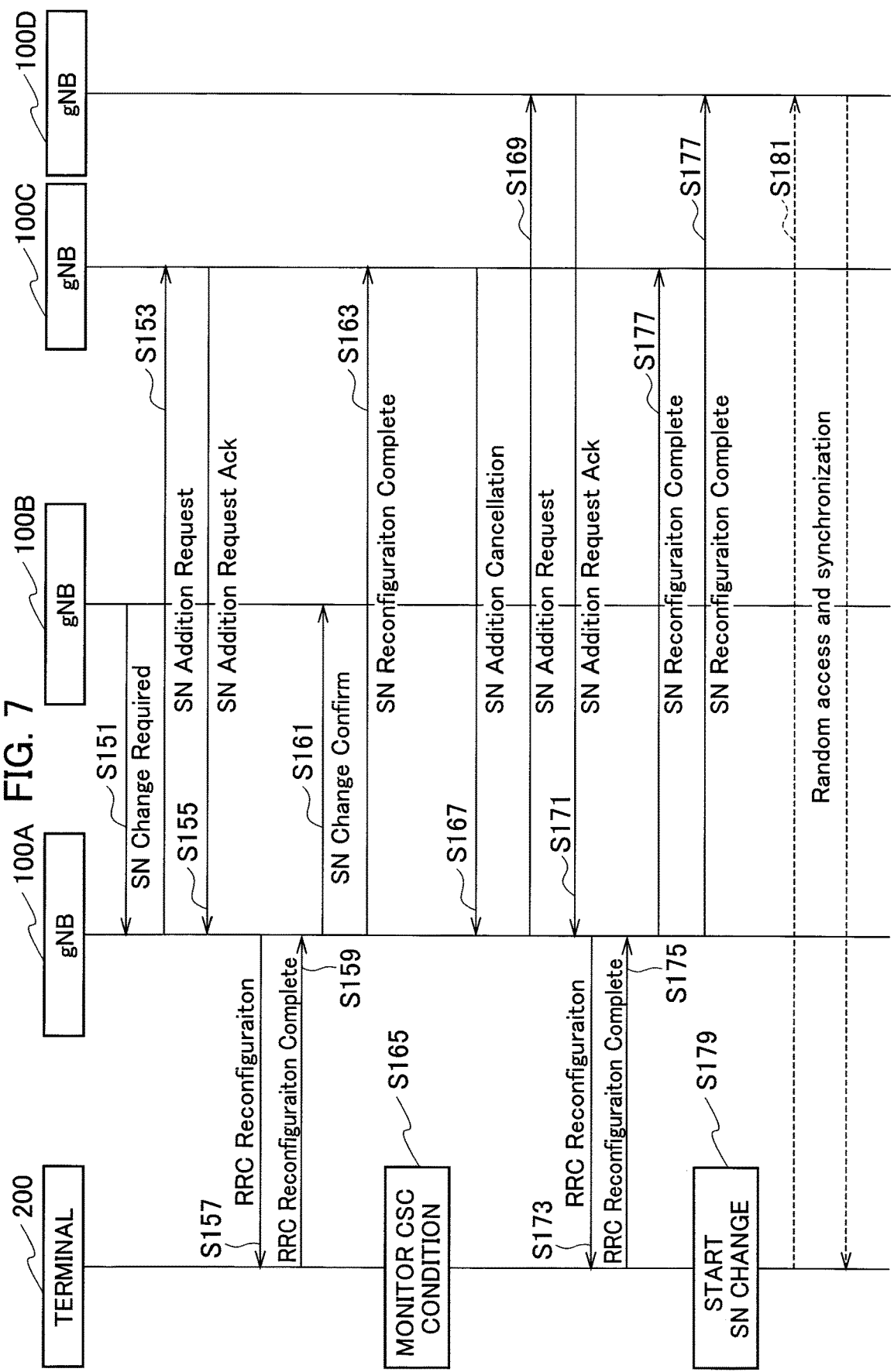
FIG. 7 is a diagram illustrating a sequence of cancelling SN addition (Operation Example 4) in the Conditional SCG change.

FIG. 7 is a diagram illustrating a sequence of cancelling SN addition (Operation Example 4) in the Conditional SCG change. Since S153 to S159 and S163 to 181 illustrated in FIG. 7 are the same processing as S51, S53, and S59 to S81 illustrated in FIG. 5, an explanation thereof is omitted.

The gNB 100B (source SN) transmits SN Change Required to the gNB 100A (MN) (S151). When receiving SN Change Required from the gNB 100B (source SN), the gNB 100A (MN) transmits SN Addition Request to the gNB 100C (SN) (S153).

When receiving RRC Reconfiguration Complete from the terminal 200 (S159), the gNB 100A (MN) transmits SN Change Confirm to the gNB 100B (source SN) (S161).

When SN Change Confirm is transmitted to the gNB 100B (source SN), the gNB 100B (source SN) transmits SN Reconfiguration Complete to the gNB 100C (S163).

When receiving SN Change Confirm from the gNB 100A (MN), the gNB 100B (source SN) stops data transmission to the terminal 200 and releases an SN resource.

(3.2) Configuration of RRC Reconfiguration in Conditional SCG Change

Next, a configuration of RRC Reconfiguration in the Conditional SCG change will be described. In this configuration, RRC Reconfiguration includes configuration information of a candidate cell subordinate to the gNB 100C (SN) and configuration information of a candidate cell subordinate to the gNB 100D (SN). Note that "including plural pieces of configuration information of candidate cells into RRC Reconfiguration" is also expressed as "encapsulating plural pieces of configuration information of candidate cells in RRC Reconfiguration".

Figure 8:
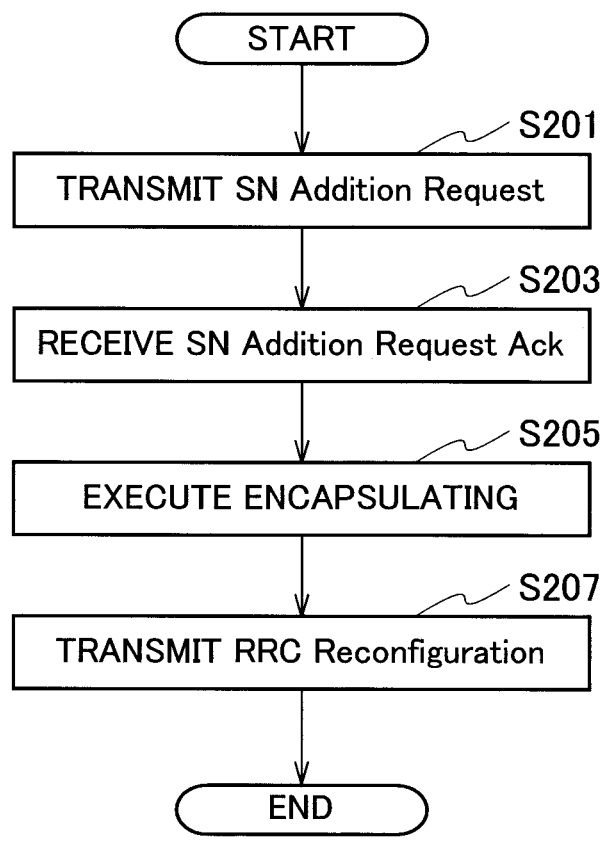
FIG. 8 is a diagram illustrating an operation flow of the gNB 100A that encapsulates plural pieces of configuration information of candidate cells.

First, an operation flow of encapsulating plural pieces of configuration information of candidate cells will be described. FIG. 8 is a diagram illustrating an operation flow of encapsulating plural pieces of configuration information of candidate cells. As illustrated in FIG. 8, the gNB 100A (MN) transmits SN Addition Request to each of the gNBs 100C and 100D (SN) (S201).

When receiving configuration information of a candidate cell from each of the gNBs 100C and 100D (SN) by using SN Addition Request Ack (S203), the gNB 100A (MN) encapsulates the two pieces of configuration information of the candidate cells in RRC Reconfiguration (S205).

When encapsulating the two pieces of configuration information of the candidate cells in RRC Reconfiguration, the gNB 100A (MN) transmits RRC Reconfiguration to the terminal 200 (S207).

(3.2.1) Configuration Example 1

Figure 9:
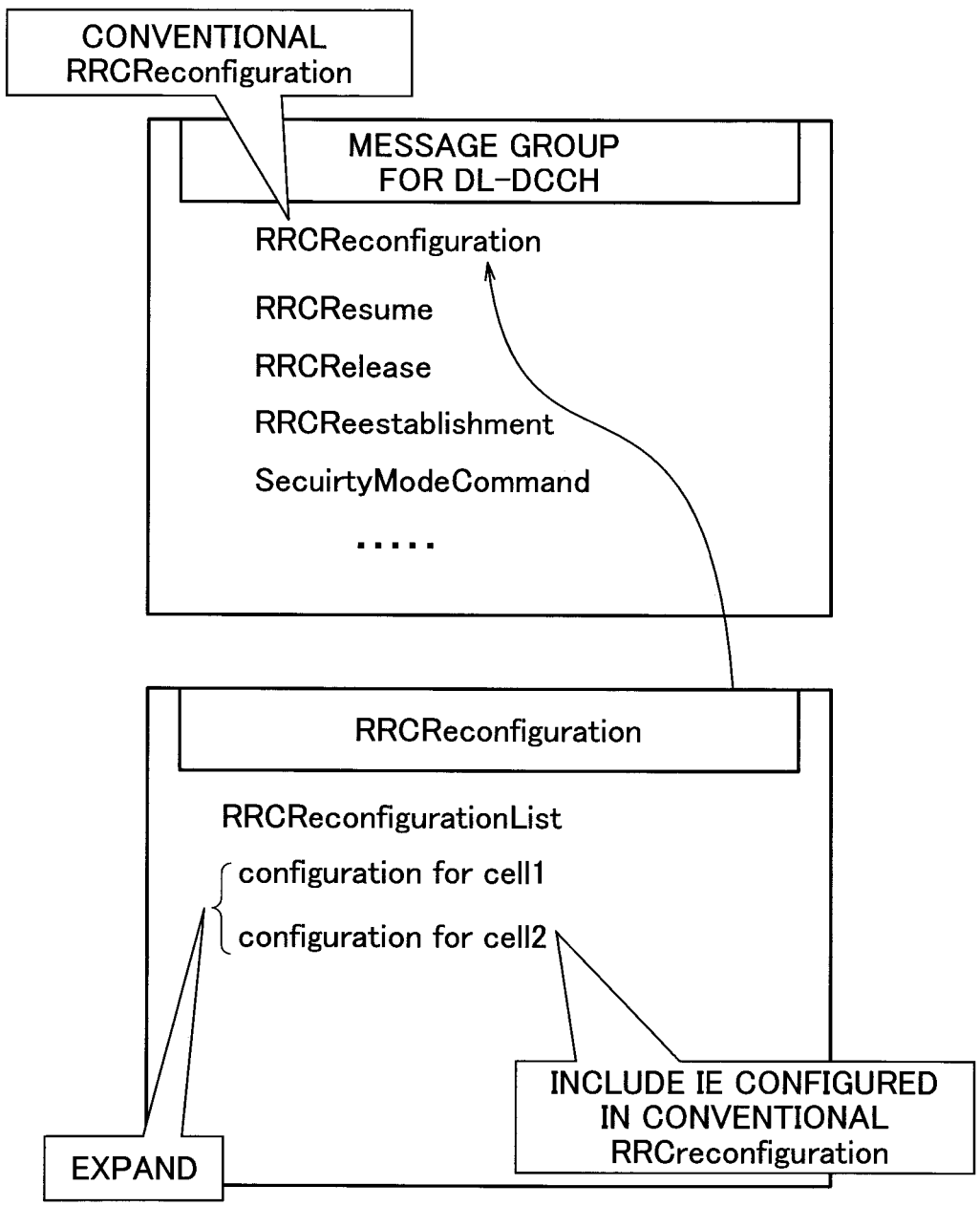
FIG. 9 is a diagram for explaining a configuration of RRC Reconfiguration (Configuration Example 1) in the Conditional SCG change.

Next, the encapsulation of the plural pieces of configuration information of the candidate target cells will be described in detail. FIG. 9 is a diagram for explaining a configuration of RRC Reconfiguration (Configuration Example 1) in the Conditional SCG change.

As illustrated in FIG. 9, a downlink-dedicated control channel (DL-DCCH) message group includes RRC Reconfiguration, an RRC resume message (RRC Resume), an RRC release message (RRC Release), an RRC establishment message (RRC Reestablishment), a security mode command (Security Mode Command), and the like.

DL-DCCH is a downlink-dedicated control channel used by the terminal 200 that has established RRC connection. The terminal 200 receives the above-described RRC message and the like on the DL-DCCH.

In this configuration example, a new information element (IE) is set in the conventional RRC Reconfiguration, and the configuration information of the candidate cell subordinate to the target gNB 100C and the configuration information of the candidate cell subordinate to the target gNB 100D are included in the IE.

Specifically, an RRC reconfiguration list (RRCReconfigurationList) is set as a new IE in the conventional RRC Reconfiguration, and configuration for cell1 and configuration for cell2 are set in RRCReconfigurationList. Note that the number of configuration for cells is not limited to two.

In such a configuration, when receiving the configuration information of the candidate cell from the gNB 100C (SN), the gNB 100A (MN) includes the configuration information of the candidate cell in configuration for cell1 in RRCReconfigurationList. Similarly, when receiving the configuration information of the candidate cell from the gNB 100D (SN), the gNB 100A (MN) includes the configuration information of the candidate cell in configuration for cell2 in RRCReconfigurationList.

When receiving RRC Reconfiguration from the gNB 100A (MN), the terminal 200 acquires the configuration information of the candidate cell subordinate to the gNB 100C and the configuration information of the candidate cell subordinate to the gNB 100D from configuration for cell1 and configuration for cell2 in RRC Reconfiguration, respectively.

The configuration information of the candidate cell may include at least one of the following information, in addition to the information on the candidate cell and the transition condition to the candidate cell.

Measurement condition

Configuration of candidate cell

Security information (for example, security key update information)

Transaction identifier (3.2.2) Configuration Example 2

Figure 10:
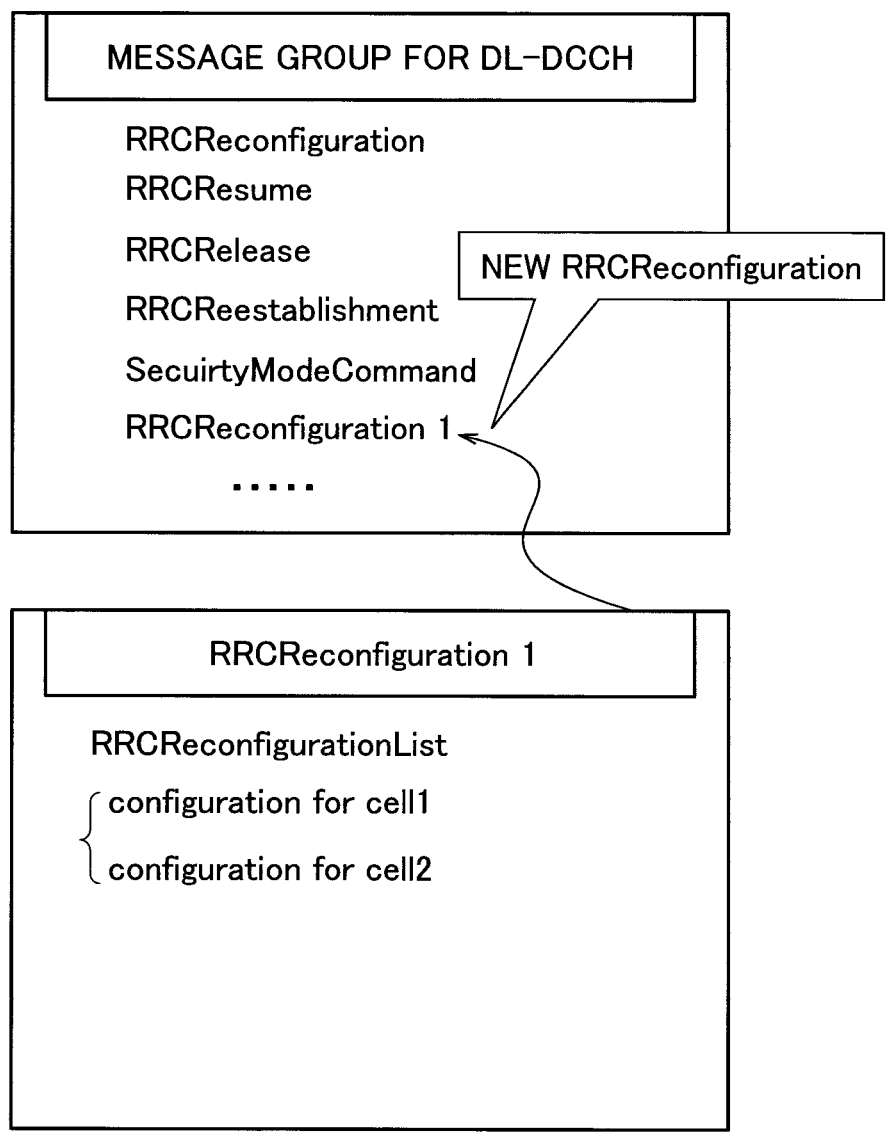
FIG. 10 is a diagram for explaining a configuration of RRC Reconfiguration (Configuration Example 2) in the Conditional SCG change.

FIG. 10 is a diagram for explaining a configuration of RRC Reconfiguration (Configuration Example 2) in the Conditional SCG change. As illustrated in FIG. 10, a DL-DCCH message group includes RRC Reconfiguration, RRC Resume, RRC Release, RRC Reestablishment, Security Mode Command, RRC Reconfiguration1, and the like.

RRC Reconfiguration1 is a new message different from the conventional RRC Reconfiguration, and is an RRC reconfiguration message used in the Conditional SCG change. Note that the name of the new message is not limited to RRC Reconfiguration1. In the present configuration example, the configuration information of the candidate cell subordinate to the gNB 100C and the configuration information of the candidate cell subordinate to the gNB 100D are included in an information element (IE) set in RRC Reconfiguration1.

Specifically, an RRC reconfiguration list (RRCReconfigurationList) is set in the new RRC Reconfiguration1, and configuration for cell1 and configuration for cell2 are set in RRCReconfigurationList. Note that the number of configuration for cells is not limited to two.

In such a configuration, when receiving the configuration information of the candidate cell from the gNB 100C (SN), the gNB 100A (MN) includes the configuration information of the candidate cell in configuration for cell1 in RRCReconfigurationList. Similarly, when receiving the configuration information of the candidate cell from the gNB 100D (SN), the gNB 100A (MN) includes the configuration information of the candidate cell in configuration for cell2 in RRCReconfigurationList.

When receiving RRC Reconfiguration1 from the gNB 100A (MN), the terminal 200 acquires the configuration information of the candidate cell subordinate to the gNB 100B and the configuration information of the candidate cell subordinate to the gNB 100C from configuration for cell1 and configuration for cell2 in RRC Reconfiguration1, respectively.

(3.3) Assignment of Transaction ID in Conditional SCG Change

Next, transaction ID assignment in the Conditional SCG change will be described. In this operation, the gNB 100A

(MN) or each of the gNBs 100C, 100D (SN) performs assignment of a transaction ID used in the Conditional SCG change.

(3.3.1) Operation Example 1

First, Operation Example 1 of ID assignment in the Conditional SCG change will be described. In the present operation example, the gNB 100A (MN) performs assignment of a transaction ID used in the Conditional SCG change.

Figure 11:
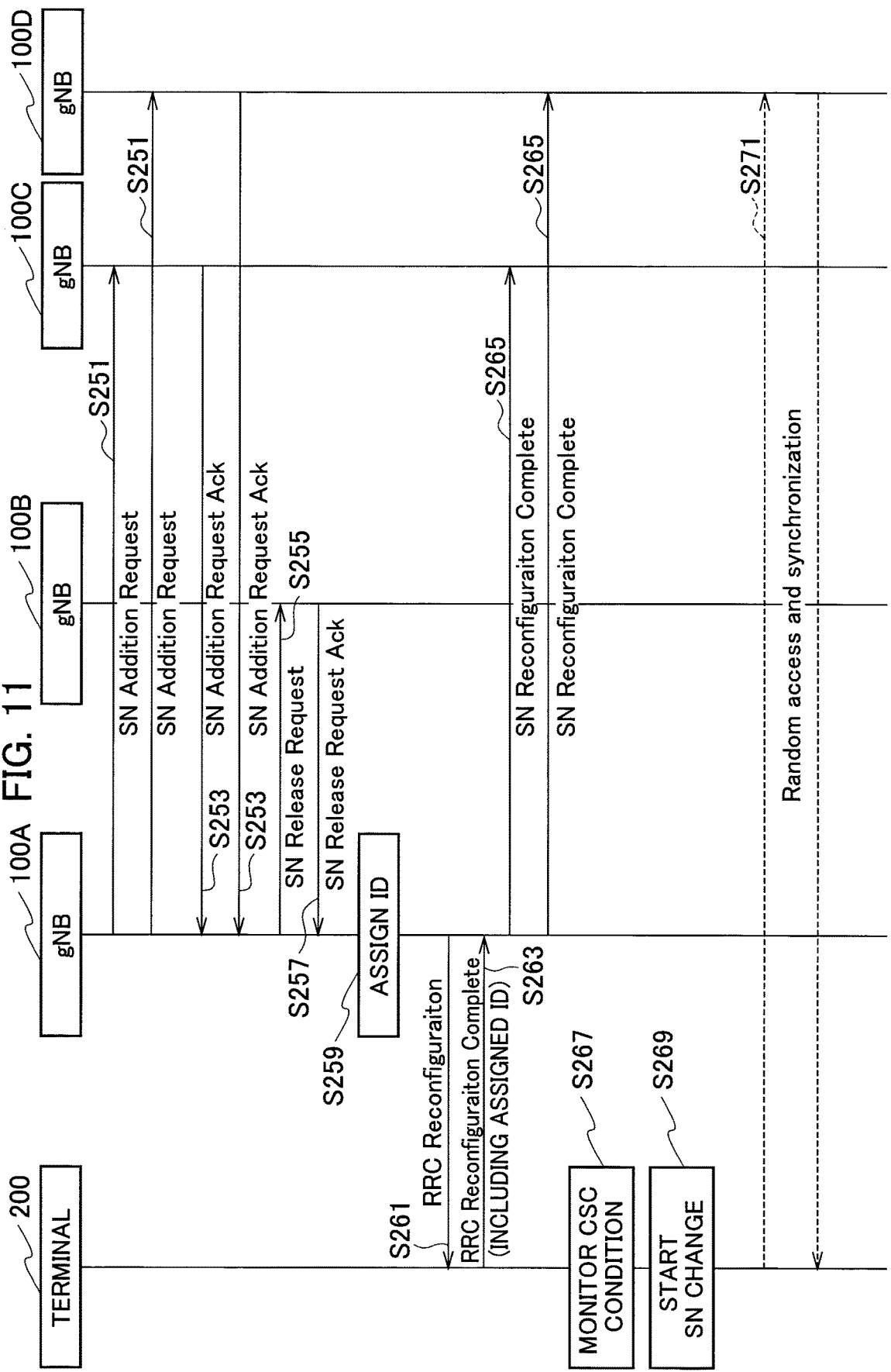
FIG. 11 is a diagram illustrating a transaction ID assignment sequence (Operation Example 1) in the Conditional SCG change.

FIG. 11 is a diagram illustrating a transaction ID assignment sequence (Operation Example 1) in the Conditional SCG change. S251 to S257 and S265 to S271 illustrated in FIG. 11 are the same processing as S11 to S17, S23, S25, S35, and S37 illustrated in FIG. 4, and thus a description thereof will be omitted.

As illustrated in FIG. 11, when receiving an SN Release Request Ack from the gNB 100B (source SN), the gNB 100A (MN) includes plural pieces of configuration information of the candidate cells, which are received from the gNBs 100C and 100D (SN), in RRC Reconfiguration and assigns a transaction ID to RRC Reconfiguration (S259).

Specifically, the gNB 100A (MN) includes, in RRCReconfigurationList in RRC Reconfiguration, identification information of the candidate cell subordinate to the gNB 100C (SN) and identification information of the candidate cell subordinate to the gNB 100D (SN), and sets a transaction ID for a predetermined information element (IE) in RRC Reconfiguration (see FIG. 9).

Note that the gNB 100A (MN) may include, in RRCReconfigurationList in RRC Reconfiguration1 which is an RRC reconfiguration message used in the Conditional SCG change, the identification information of the candidate cell subordinate to the gNB 100C (SN) and the identification information of the candidate cell subordinate to the gNB 100D (SN), and set a transaction ID for a predetermined information element (IE) in RRC Reconfiguration1 (see FIG. 10).

The transaction ID may be one of 0 to 3 or a fixed value of 0. In the present embodiment, the transaction ID is one of 0 to 3.

The gNB 100A (MN) may assign a transaction ID to RRCReconfigurationList included in RRC Reconfiguration, that is, a group of encapsulated plural pieces of configuration information of candidate cells, instead of assigning the transaction ID to RRC Reconfiguration.

When setting RRC Reconfiguration, the gNB 100A (MN) transmits the RRC Reconfiguration to the terminal 200 (S261).

When receiving RRC Reconfiguration from the gNB 100A (MN), the terminal 200 transmits RRC Reconfiguration Complete to the gNB 100A (MN) (S263). The terminal 200 acquires the plural pieces of the configuration information of the candidate cells from RRC Reconfiguration, upon the reception of RRC Reconfiguration.

In S263, the terminal 200 includes, in RRC Reconfiguration Complete, the transaction ID assigned to RRC Reconfiguration received from the gNB 100A (MN).

The terminal 200 monitors a CSC condition (S267), starts an SN change to the gNB 100D (SN) (S269), and performs a RA procedure (S271) between the gNB 100D (SN) and the terminal 200, and is connected to the gNB 100D (target SN).

Note that although assignment of a transaction ID in an MN-initiated SN change has been explained in the present operation example, the present operation example is not limited to it. The present operation example is also applicable to a source SN-initiated SN change.

(3.3.2) Operation Example 2

Next, Operation Example 2 of ID assignment in the Conditional SCG change will be described. In the present operation example, each of the gNBs 100C and 100D (SN) performs assignment of a transaction ID to be used in the Conditional SCG change.

Figure 12:
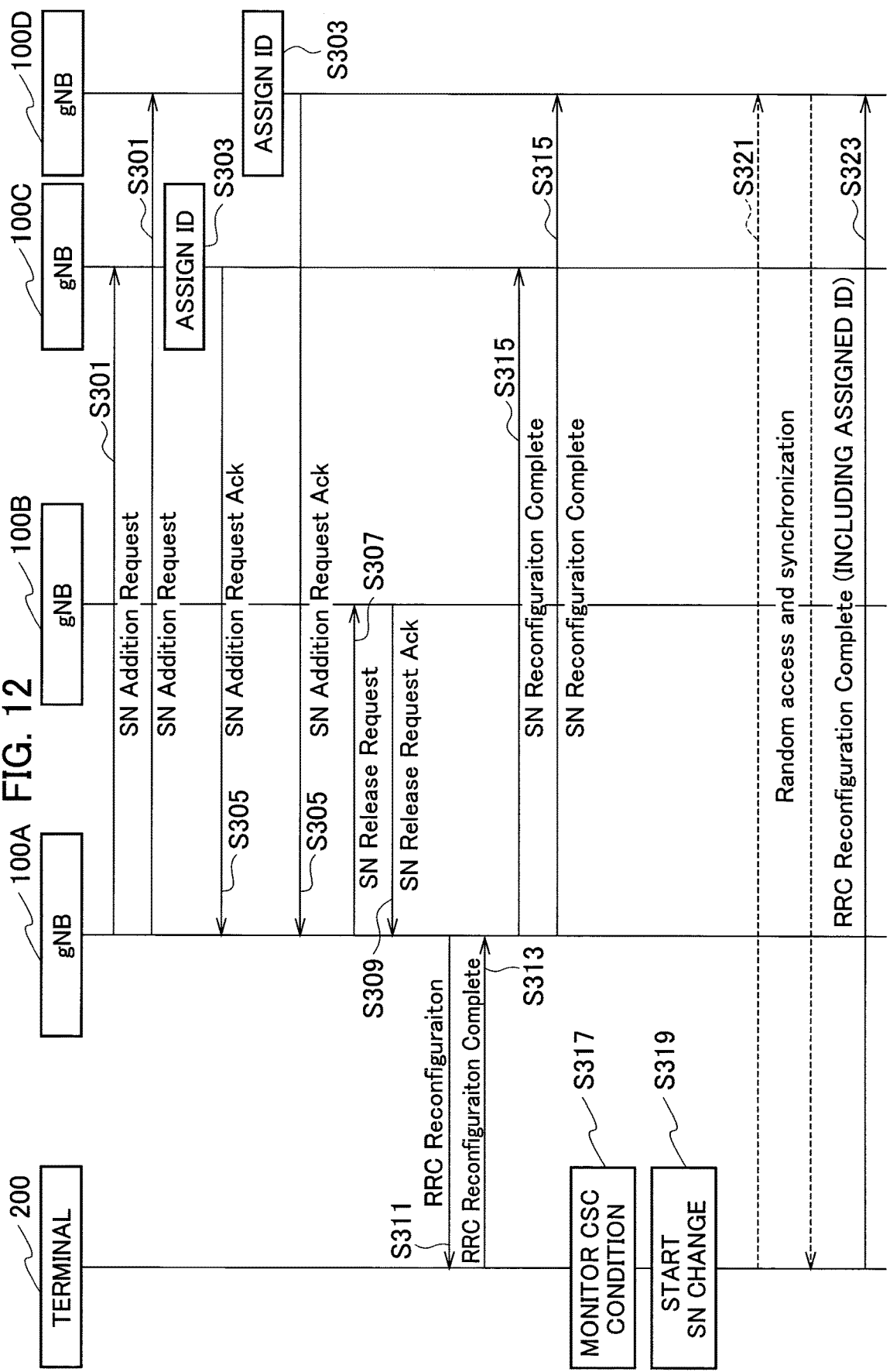
FIG. 12 is a diagram illustrating a transaction ID assignment sequence (Operation Example 2) in the Conditional SCG change.

FIG. 12 is a diagram illustrating a transaction ID assignment sequence (Operation Example 2) in the Conditional SCG change. S301 and S307 to S321 illustrated in FIG. 12 are the same processing as S11, S15 to S25, S35, and S37 illustrated in FIG. 4, and thus a description thereof will be omitted.

As illustrated in FIG. 12, when receiving an SN Addition Request from the gNB 100A (MN), the gNB 100C (SN) includes, in an SN Addition Request Ack, the configuration information of the candidate cell subordinate to the gNB 100C (SN), and assigns a transaction ID to the configuration information of the candidate cell (S303). Specifically, the gNB 100C (SN) includes the transaction ID in the configuration information of the candidate cell.

Similarly, when receiving an SN Addition Request from the gNB 100A (MN), the gNB 100D (SN) includes, in an SN Addition Request Ack, the configuration information of the candidate cell subordinate to the gNB 100D (SN), and assigns a transaction ID to the configuration information of the candidate cell (S303). Specifically, the gNB 100D (SN) includes the transaction ID in the configuration information of the candidate cell.

The transaction ID may be one of 0 to 3 or a fixed value of 0. In the present embodiment, the transaction ID is one of 0 to 3.

When receiving the SN Addition Request Ack from each of the gNBs 100C and 100D (SN), the gNB 100A (MN) includes, in RRC Reconfiguration, the configuration information of the candidate cell received from each of the gNBs 100C and 100D (SN). Specifically, the gNB 100A (MN) includes, in RRCReconfigurationList in RRC Reconfiguration, the identification information of the candidate cell subordinate to the gNB 100C (SN) to which the transaction ID is assigned, and the identification information of the candidate cell subordinate to the gNB 100D (SN) to which the transaction ID is assigned (See FIG. 9).

Note that the gNB 100A (MN) may include, in RRCReconfigurationList in RRC Reconfiguration1 which is an RRC reconfiguration message used in the Conditional SCG change, the identification information of the candidate cell subordinate to the gNB 100C (SN) and the identification information of the candidate cell subordinate to the gNB 100D (SN) (See FIG. 10).

When setting RRC Reconfiguration, the gNB 100A (MN) transmits the RRC Reconfiguration to the terminal 200 (S311).

When receiving RRC Reconfiguration from the gNB 100A (MN), the terminal 200 transmits RRC Reconfiguration Complete to the gNB 100A (MN) (S313). The terminal 200 acquires the plural pieces of the configuration information of the candidate cells from RRC Reconfiguration, upon the reception of RRC Reconfiguration.

The terminal 200 monitors a CSC condition (S317), starts an SN change to the gNB 100D (SN) (S319), and performs a RA procedure (S321) between the gNB 100D (SN) and the terminal 200, and is connected to the gNB 100D (target SN).

When the terminal 200 is connected to the gNB 100D (target SN), the terminal 200 transmits RRC Reconfiguration Complete to the gNB 100D (target SN) (S323).

In S323, the terminal 200 includes, in RRC Reconfiguration Complete, the transaction ID included in the configuration information of the candidate cell subordinate to the gNB 100D (target SN).

Note that although assignment of a transaction ID in an MN-initiated SN change has been explained in the present operation example, the present operation example is not limited to it. The present operation example is also applicable to a source SN-initiated SN change.

(4) Action/Effect

According to the above-described embodiments, the gNB 100C (SN) transmits, to the gNB 100A (MN) to which the terminal 200 is connected, SN Addition Request Ack including configuration information of a candidate cell formed by the gNB 100C (SN). The gNB 100C (SN) determines to delete the configuration information of the candidate cell according to a state of the candidate cell. The gNB 100C (SN) transmits, to the gNB 100A (MN), SN Addition Cancellation instructing deletion of the configuration information of the candidate cell.

With such a configuration, the gNB 100A (MN) does not need to determine, based on a load state of the candidate cell which is notified from the gNB 100C (SN), whether the candidate cell is suitable as a candidate cell in a transition destination.

Thus, even in a case where the terminal 200 performs an SN change based on configuration information of a candidate cell, it is possible to avoid an increase in a load on the gNB 100A (MN).

According to the above-described embodiments, in a case where the terminal 200 does not transition to the gNB 100C (SN) within a specified period based on configuration information of a candidate cell, the gNB 100C (SN) transmits SN Addition Cancellation to the gNB 100A (MN).

With such a configuration, the gNB 100C (SN) can give an opportunity for a terminal other than the terminal 200 to transition to the gNB 100C (SN).

According to the above-described embodiments, the gNB 100A (MN) receives, from each of the gNBs 100C and 100D (SN), configuration information of a candidate cell formed by each gNB (SN). The gNB 100A (MN) includes, into RRC Reconfiguration, a list including the plural pieces of the configuration information of the candidate cells. The gNB 100A (MN) transmits RRC Reconfiguration to the terminal 200.

With such a configuration, the gNB 100A (MN) can transmit, to the terminal 200, plural pieces of configuration information of candidate cells in a single message.

Thus, even in a case where the terminal 200 performs an SN change based on configuration information of a candidate cell, it is possible to avoid an increase in a load on the gNB 100A (MN).

According to the above-described embodiments, the gNB 100A (MN) assigns a transaction ID to RRC Reconfiguration.

With such a configuration, the gNB 100A (MN) does not need to assign a transaction ID to configuration information of each candidate cell.

Thus, even in a case where the terminal 200 performs an SN change based on configuration information of a candidate cell, it is possible to avoid an increase in a load on the gNB 100A (MN).

According to the above-described embodiments, the gNB 100C (SN) assigns a transaction ID to configuration information of a candidate cell formed by the gNB 100C (SN). The gNB 100C (SN) transmits, to the gNB 100A (MN) to which the terminal 200 is connected, the identification information of the candidate cell to which the transaction ID is assigned.

Similarly, the gNB 100D (SN) assigns a transaction ID to configuration information of a candidate cell formed by the gNB 100D (SN). The gNB 100D (SN) transmits, to the gNB 100A (MN) to which the terminal 200 is connected, the identification information of the candidate cell to which the transaction ID is assigned.

With such a configuration, the gNB 100A (MN) does not need to assign a transaction ID to configuration information of each candidate cell.

Thus, even in a case where the terminal 200 performs an SN change based on configuration information of a candidate cell, it is possible to avoid an increase in a load on the gNB 100A (MN).

(5) Other Embodiments

Although the contents of the present invention have been described according to the embodiment, the present invention is not limited to these descriptions, and it is obvious to those skilled in the art that various modifications and improvements can be made thereto.

For example, in the embodiment described above, the NR has been described as an example. However, the Conditional SCG change can also be applied to LTE, and the same operation may be performed in the LTE.

The block diagrams (FIGS. 2 and 3) used for describing the above-described embodiment illustrate blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as described above, the realization method is not particularly limited to any one method.

Figure 13:
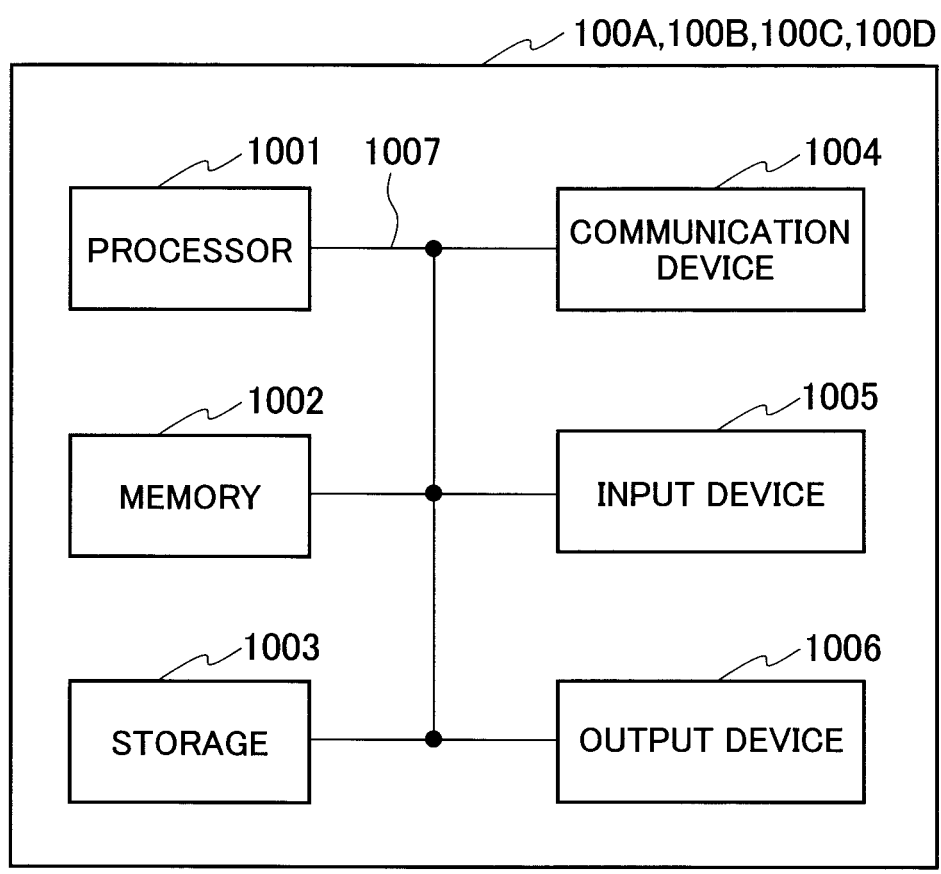
FIG. 13 is a diagram illustrating an example of a hardware configuration of each of the gNBs 100A, 100B, 100C, and 100D.

Furthermore, the gNBs 100A, 100B, 100C, and 100D and the terminal 200 described above may function as a computer that performs the processing of the radio communication method of the present disclosure. FIG. 13 is a diagram illustrating an example of a hardware configuration of the device. As illustrated in FIG. 30, the device can be configured as a computer device including a processor 1001, a memory 1002, a storage 1003, a communication device 1004, an input device 1005, an output device 1006, a bus 1007, and the like.

Furthermore, in the following description, the term "device" can be replaced with a circuit, device, unit, and the like. A hardware configuration of the device may be constituted by including one or plurality of the devices illustrated in the figure, or may be constituted without including some of the devices.

Each functional block of the device is realized by any of hardware elements of the computer device or a combination of the hardware elements.

Moreover, the processor 1001 performs operation by loading predetermined software (computer program) on hardware such as the processor 1001 and the memory 1002, and realizes various functions of the device by controlling communication via the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a computer program (computer program code), a software module, data, and the like from at least one of the storage 1003 and the communication device 1004 into the memory 1002, and executes various processing according to them. As the computer program, a computer program that is capable of executing on the computer at least a part of the operation described in the above embodiments, is used. Alternatively, various processing described above may be executed by one processor 1001 or may be executed simultaneously or sequentially by two or more processors 1001. The processor 1001 may be implemented by using one or more chips. Alternatively, the computer program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, and a Blu-ray (Registered Trademark) disk), a smart card, a flash memory (for example, a card, a stick, and a key drive), a floppy (Registered Trademark) disk, a magnetic strip, and the like. The storage 1003 may be called an auxiliary storage device. The recording medium can be, for example, a database including at least one of the memory 1002 and the storage 1003, a server, or other appropriate media.

The communication device 1004 is hardware (transmission and reception device) capable of performing communication between computers via at least one of a wired network and wireless network. The communication device 1004 is also called, for example, a network device, a network controller, a network card, a communication module, or the like.

The communication device 1004 may include a radio-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these kinds of hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination of these. The RRC signaling may be called RRC message, for example, or may be an RRC Connection Setup message, an RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input and output information can be stored in a specific location (for example, a memory) or may be managed in a management table. The information to be input and output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote sources by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

Note that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure can be used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (Remote Radio Head: RRH)).

The term "cell" or "sector" refers to a part or all of the coverage area of at least one of a base station and a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable terms.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter, the same applies). For example, each of the aspects/embodiments of the present disclosure may be applied to a configuration that allows communication between a base station and a mobile station to be replaced with a communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

A radio frame may be configured with one or more frames in time domain. One frame or each of a plurality of frames in the time domain may be called a subframe.

Further, the subframe may be configured with one or more slots in the time domain. The subframe may be a fixed time length (for example, 1 ms) that does not depend on numerology.

The numerology may be a communication parameter applied to at least one of transmission or reception of a certain signal or channel. The numerology may represent, for example, at least one of a subcarrier spacing (SCS), a bandwidth, a symbol length, a cyclic prefix length, a Transmission Time Interval (TTI), the number of symbols per TTI, a radio frame configuration, specific filtering processing performed by a transceiver in the frequency domain, or specific windowing processing performed by the transceiver in the time domain.

The slot may be configured with one or more symbols (Orthogonal Frequency Division Multiplexing (OFDM) symbols, Single Carrier Frequency Division Multiple Access (SC-FDMA) symbols, and the like) in the time domain. The slot may be a unit of time based on the numerology.

The slot may include a plurality of minislots. Each minislot may be configured with one or more symbols in the time domain. Further, the minislot may also be called a subslot. The minislot may be configured with fewer symbols than those of slots. A PDSCH (or PUSCH) transmitted in a time unit larger than the minislot may be called a PDSCH (or PUSCH) mapping type A. A PDSCH (or PUSCH) transmitted using the minislot may be called a PDSCH (or PUSCH) mapping type B.

Each of the radio frame, subframe, slot, minislot, and symbol represents a time unit for transmitting a signal. Different names may be used for the radio frame, subframe, slot, minislot, and symbol, respectively.

For example, one subframe may be called a transmission time interval (TTI), a plurality of consecutive subframes may be called a TTI, and one slot or one minislot may be called a TTI. That is, at least one of the subframe or the TTI may be a subframe (1 ms) in the existing LTE, a period shorter than 1 ms (for example, 1 to 13 symbols), or a period longer than 1 ms. Note that a unit representing the TTI may also be called a slot, a minislot, or the like, instead of a subframe.

Here, the TTI refers to a minimum time unit of scheduling in radio communication, for example. For example, in the LTE system, a base station performs scheduling to allocate radio resources (frequency bandwidth, transmission power, or the like that can be used in each user terminal) to each user terminal in units of TTI. Note that the definition of the TTI is not limited thereto.

The TTI may be a transmission time unit such as a channel-encoded data packet (transport block), a code block, or a code word, or may be a processing unit of scheduling, link adaptation, or the like. Note that, when a TTI is given, a time interval (for example, the number of symbols) in which a transport block, a code block, a code word, or the like is actually mapped may be shorter than the TTI.

Note that, in a case where one slot or one minislot is called a TTI, one or more TTIs (that is, one or more slots or one or more minislots) may be a minimum time unit of scheduling. Further, the number of slots (the number of minislots) constituting the minimum time unit of the scheduling may be controlled.

A TTI having a time length of 1 ms may be called a normal TTI (TTI in LTE Rel. 8 to 12), a normal TTI, a long TTI, a normal subframe, a long subframe, a slot, or the like. A TTI shorter than the normal TTI may be called a shortened TTI, a short TTI, a partial TTI (partial or fractional TTI), a shortened subframe, a short subframe, a minislot, a subslot, a slot, or the like.

Note that the long TTI (for example, the normal TTI, the subframe, or the like) may be read as a TTI having a time length exceeding 1 ms, and the short TTI (for example, the shortened TTI or the like) may be read as a TTI having a TTI length of less than the TTI length of the long TTI and equal to or more than 1 ms.

The resource block (RB) is a resource allocation unit in the time domain and the frequency domain, and may include one or more consecutive subcarriers in the frequency domain. The number of subcarriers included in the RB may be the same regardless of the numerology, for example, twelve. The number of subcarriers included in the RB may be determined based on the numerology.

Further, the time domain of the RB may include one or more symbols, and may have a length of one slot, one minislot, one subframe, or one TTI. One TTI, one subframe, or the like may be configured with one or a plurality of resource blocks.

Note that one or more RBs may be called a physical resource block (Physical RB: PRB), a subcarrier group (Sub-Carrier Group: SCG), a resource element group (Resource Element Group: REG), a PRB pair, an RB pair, or the like.

Further, the resource block may be configured with one or more resource elements (RE). For example, one RE may be a radio resource region of one subcarrier and one symbol.

The bandwidth part (BWP) (which may be called a partial bandwidth, or the like) may represent a subset of continuous common resource blocks (RBs) for certain numerology in a certain carrier. Here, the common RB may be specified by an index of RB based on a common reference point of the carriers. The PRB may be defined in a certain BWP and numbered within the BWP.

The BWP may include a BWP (UL BWP) for UL and a BWP (DL BWP) for DL. One or more BWPs may be configured in one carrier for a UE.

At least one of the configured BWPs may be active, and the UE may not assume that a predetermined signal/channel is transmitted and received outside the active BWP. Note that "cell", "carrier", and the like in the present disclosure may be read as "BWP".

The above-described structures such as a radio frame, a subframe, a slot, a minislot, and a symbol are merely examples. For example, the configuration such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, and a cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, printed electrical connections, and as some non-limiting and non-exhaustive examples, by using electromagnetic energy having wavelengths in the radio frequency domain, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in any other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles may include a plurality of nouns following these articles.

The terms "determining" and "determining" used in the present disclosure may encompass a wide variety of operations. The terms "determining" and "deciding" can include, for example, judging, calculating, computing, processing, deriving, investigating, looking up (search or inquiry) (for example, searching in a table, database, or other data structure), and ascertaining. In addition, the terms "determining" and "deciding" can include receiving (for example, receiving information), transmitting (for example, transmitting information), inputting, outputting, and accessing (for example, accessing data in a memory), and the like. In addition, the terms "determining" and "deciding" can include "resolving", "selecting", "choosing", "establishing", "comparing", and the like. In other words, the terms "determining" and "deciding" can include any operation. Further, the term "determining (deciding)" may also be read as "assuming", "expecting", "considering", and the like.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

In a case of the above-described master node and secondary node, even in a case where a terminal changes a secondary node based on configuration information of a candidate cell, it is possible to avoid an increase in a load on the master node, which is useful.

EXPLANATION OF REFERENCE NUMERALS

10 Radio communication system
100A, 100B, 100C, 100D gNB
110a, 110b Transmitting unit
120a, 120b Receiving unit
130a Retaining unit
130b Acquiring Unit
140a, 140b Control unit
200 Terminal
1001 Processor
1002 Memory
1003 Storage
1004 Communication device
1005 Input device
1006 Output device
1007 Bus

The invention claimed is:

1. A terminal comprising:
a receiving unit that receives from a master node, a reconfiguration message including a transition condition and information of a candidate cell to which a target secondary node assigns a transaction ID;
a control unit that performs a synchronization with the candidate cell when the transition condition is satisfied, and performs a transition from a source secondary node to the target secondary node; and
a transmitting unit that transmits a complete message including the transaction ID to the target secondary node when the transition condition is satisfied.

2. A secondary node comprising:
a control unit that assigns a transaction ID to information of a candidate cell;
a transmitting unit that transmits the information of the candidate cell to a master node; and
a receiving unit that receives a complete message including the transaction ID from a terminal which receives a reconfiguration message including a transition condition and the information of the candidate cell from the master node, and performs a synchronization with the candidate cell when the transition condition is satisfied.

3. A radio communication system comprising:
a master node; a source secondary node; a target secondary node; and a terminal,
wherein the target secondary node assigns a transaction ID to information of a candidate cell,
the target secondary node transmits the information of the candidate cell to the master node,
the master node transmits a reconfiguration message including a transition condition and the information of the candidate cell to the terminal,
the terminal performs a synchronization with the candidate cell when the transition condition is satisfied, and performs a transition from the source secondary node to the target secondary node, and the terminal transmits a complete message including the transaction ID to the target secondary node when the transition condition is satisfied.

4. A radio communication method comprising:

assigning, by a target secondary node, a transaction ID to information of a candidate cell;

transmitting, by the target secondary node, the information of the candidate cell to a master node;

transmitting, by the master node, a reconfiguration message including a transition condition and the information of the candidate cell to a terminal;

performing, by the terminal, a synchronization with the candidate cell when the transition condition is satisfied, and performing a transition from a source secondary node to the target secondary node; and transmitting, by the terminal, a complete message including the transaction ID to the target secondary node when the transition condition is satisfied.

* * * * *